No. 675,992. Patented June 11, 1901.
N. T. WILEY.
OIL CUP.
(Application filed Mar. 29, 1901.)

(No Model.)

Witnesses
W. C. Lunsford
Adolph O. Hansen

Inventor
Nathaniel T. Wiley
by Darby Gregory
att'ys.

THE NORRIS PETERS CO., PHOTO-LITHO., WASHINGTON, D. C.

UNITED STATES PATENT OFFICE.

NATHANIEL T. WILEY, OF SOMERVILLE, MASSACHUSETTS.

OIL-CUP.

SPECIFICATION forming part of Letters Patent No. 675,992, dated June 11, 1901.

Application filed March 29, 1901. Serial No. 53,556. (No model.)

*To all whom it may concern:*

Be it known that I, NATHANIEL T. WILEY, a citizen of the United States, and a resident of Somerville, county of Middlesex, State of Massachusetts, have invented an Improvement in Oil-Cups, of which the following description, in connection with the accompanying drawings, is a specification, like characters on the drawings representing like parts.

This invention relates to oil-cups of the "sight-feed" type, and more particularly to such oil-cups wherein the valve is controlled by a lever-like actuating device; and my invention has for its object the production of novel means for adjusting the oil-supply when the valve is open, whereby the operator can secure the desired oil flow quickly and without a series of trials or approximations. A locking device is provided for retaining the mechanism in adjusted position when the proper flow of oil has been determined.

Figure 1:
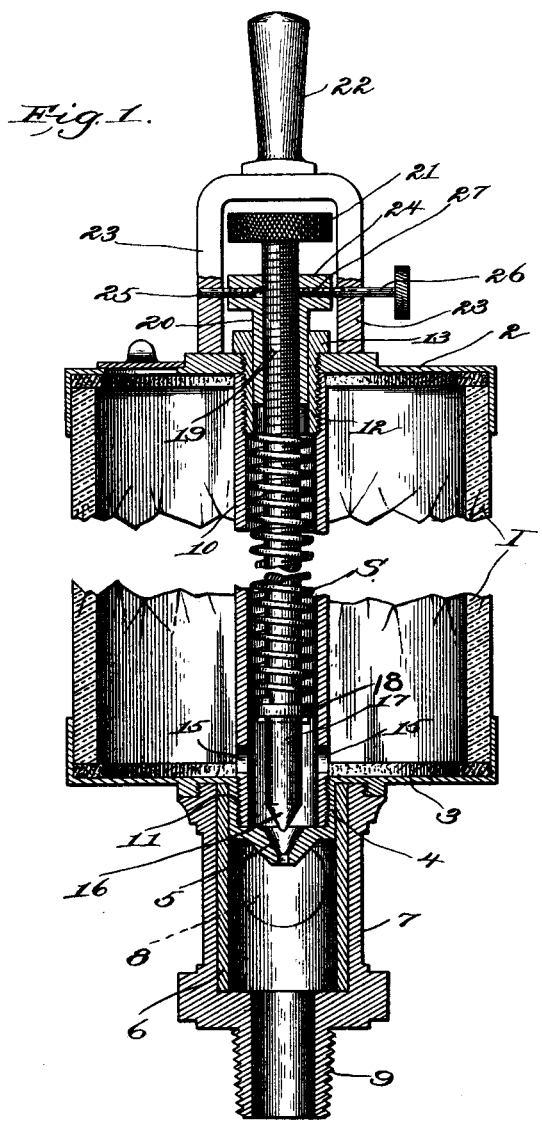
Figure 2:
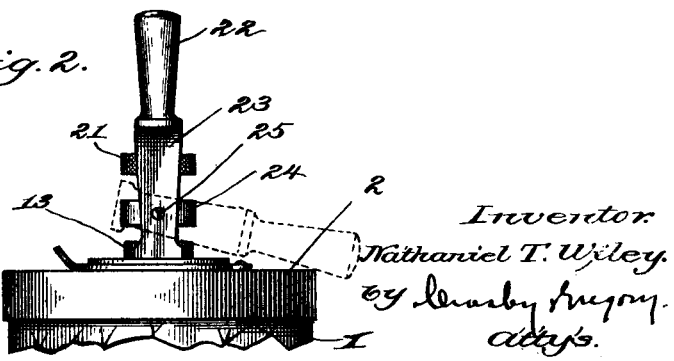

Figure 1 is a vertical central section of an oil-cup embodying my invention, showing the valve open, the view being centrally broken out to save space; and Fig. 2 is a detail in side elevation and on a smaller scale of the valve actuating and adjusting devices.

Referring to Fig. 1, a so-called "sight-feed oil-cup" is shown, comprising the usual and well-known transparent oil-reservoir 1, provided with upper and lower heads 2 3, the latter having a depending nipple 4, provided in its lower end with a valve-seat and discharge-port 5, the nipple being surrounded by a glass delivery-tube 6, supported by the hollow metallic tubular guard 7, secured to the head 3 and having a sight-opening 8 and a threaded end 9.

A hollow tube 10 is threaded at its lower end, as at 11, to screw into the correspondingly-threaded interior of the nipple 4, the upper end of the tube abutting against the inner face of the head 2, to which it is secured by an externally-threaded bushing 12, screwed into the upper internally-threaded end of the tube, the head 13 of the bushing bearing against the outer face of the head 2.

Manifestly by tightening the bushing the heads will be drawn toward each other, so that the reservoir 1 will be securely held between them, the tube 10 having one or more holes 15 at or near its lower end for the passage of oil from the reservoir to the valve-seat 5.

The valve 16 is herein shown on the lower end of a valve-spindle 17, centrally mounted within the tube 10, a coiled spring S, interposed between the bottom of the bushing 12 and a stop 18 on the spindle, operating to close the valve. At its upper end the spindle is threaded, as at 19, to engage an internally-threaded sleeve 20, which has a sliding fit in the bushing 12 and is rotatable therein, the spindle projecting beyond the outer end of the sleeve and having a milled or other suitable head 21.

The valve-actuator is herein shown as a swinging handpiece or handle 22, bifurcated at its lower end to form legs 23, which are fulcrumed upon the sleeve 20 in a peculiar manner.

The head 24 of the sleeve has extended thereinto a pivot-screw or other stud 25, which passes loosely through one of the legs 23, and directly opposite to said stud a second stud 26 is loosely extended through the other leg 23, the inner end of the stud 26 being threaded, as at 27, Fig. 1, to engage and pass through a similarly-threaded hole in the sleeve-head, so that when the said stud is screwed up tight its inner end will bear against the spindle 17 and lock it to the sleeve 20, which forms a support on which the actuator is pivoted. I have thus provided a pivotal connection between the actuator and the valve-spindle and longitudinally adjustable thereupon by relative rotation of the spindle and the connection, the actuator rocking on the top of the head 2 as a fulcrum.

When the actuator is swung into upright position, the valve will be raised from its seat, opening the discharge-port, the broad flat ends of the legs 23 providing a firm and steady support.

When the actuator is swung over, (see dotted lines, Fig. 2,) the spring S will at once seat the valve, and the flow of oil will be stopped.

The head 24 of the sleeve 20 is loosely straddled by the legs of the actuator when the valve is unseated, and it will be manifest that by rotating the spindle by means of the head 21 the valve 16 will be adjusted toward or from its seat to thus adjust the oil flow, and this adjustment is preferably made when the valve is unseated, with the parts in the position shown in Fig. 1, so that the operator can set the valve exactly so as to deliver the precise amount of oil desired. After effecting such adjustment the locking-stud 26 is set up, and the spindle and sleeve 20 are locked from relative rotative movement, so that the adjustment will not be accidentally changed, the locking being effected independently of the actuator and irrespective of its position, whether up or down.

Instead of rotating the spindle as described the valve-actuator may be rotated when the locking-stud 26 is loosened to regulate the valve-opening; but in any case the valve-opening can be adjusted while the valve is open and the oil flow in operation.

Having fully described my invention, what I claim as new, and desire to secure by Letters Patent, is—

1. In a device of the class described, a valve and its spindle, a sleeve screw-threaded upon the latter, and a rocking valve-actuator pivotally connected with the sleeve, relative rotation of the latter and the valve-spindle adjusting the valve-opening when the valve is open.

2. In a device of the class described, a valve and its spindle, a sleeve screw-threaded upon the latter, a rocking valve-actuator pivotally connected with the sleeve, relative rotation of the latter and the valve-spindle adjusting the valve-opening, and means operative through the pivotal connection between the actuator and sleeve to lock the spindle and sleeve together.

3. The combination with an oil-cup, a spring-controlled valve, and a valve-spindle having a threaded portion, of a sleeve in engagement with such threaded portion, a rocking valve-actuator pivotally connected with the sleeve, and means independent of said actuator to lock the sleeve and spindle together.

4. The combination with an oil-reservoir, and a valve having a connected spindle, of a rocking actuator, an adjustable sleeve mounted on the spindle, pivots connecting the actuator and sleeve, and means to lock the sleeve and spindle together by or through one of the pivots.

In testimony whereof I have signed my name to this specification in the presence of two subscribing witnesses.

NATHANIEL T. WILEY.

Witnesses:
JOHN C. EDWARDS,
AUGUSTA E. DEAN.